(No Model.)
W. JONES.
Scroll Saw.
No. 236,163. Patented Jan. 4, 1881.
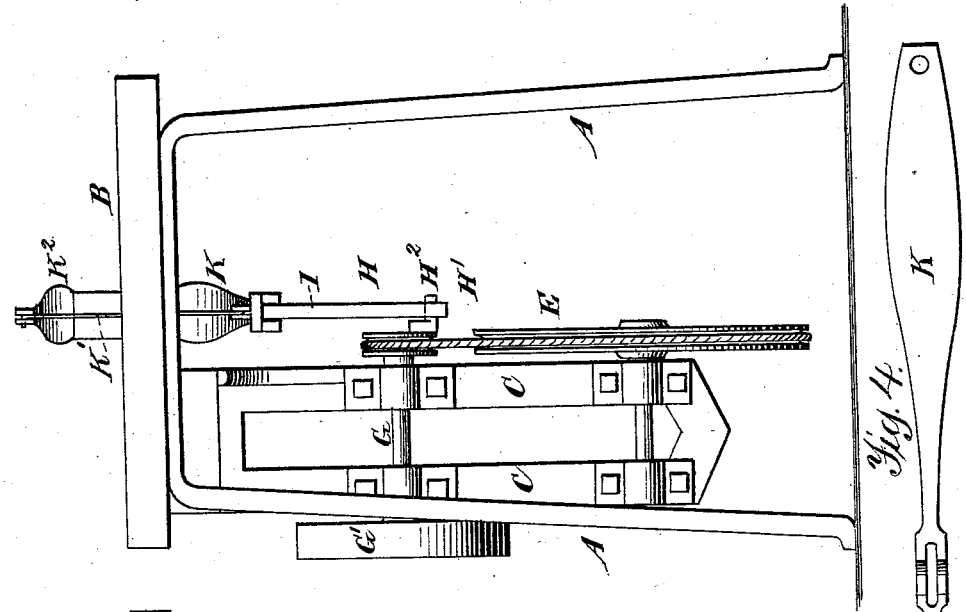
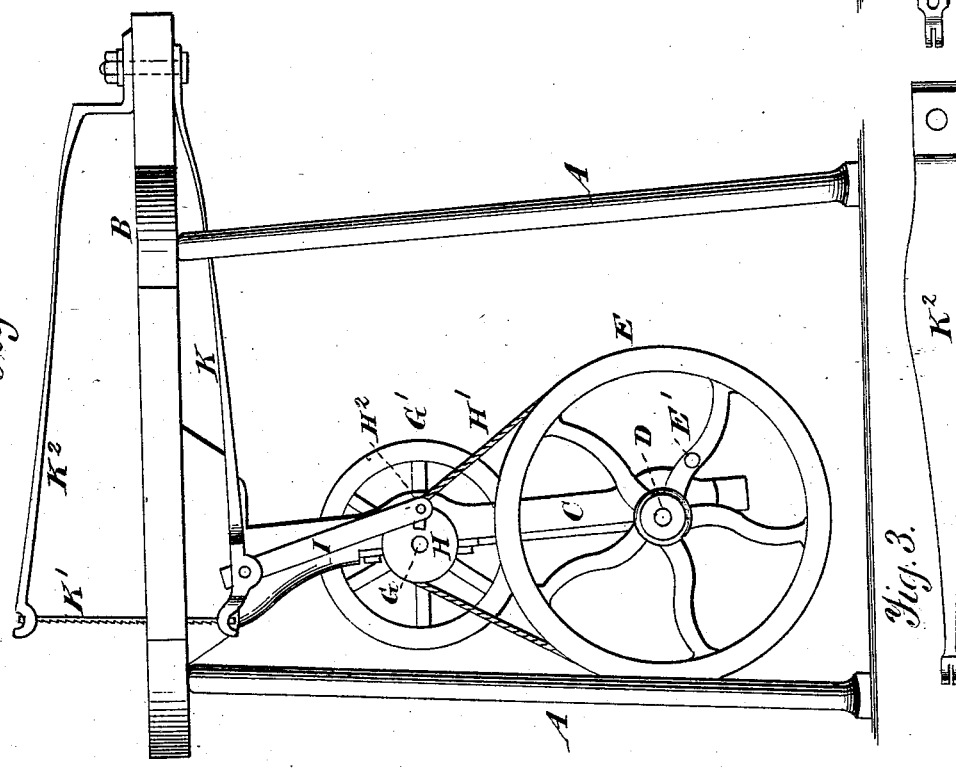
Witnesses.
A. Ruppert
D. P. Towl
Wm. Jones
Inventor:
D. P. Holloway
Atty

UNITED STATES PATENT OFFICE.

WILLIAM JONES, OF PORTLAND, INDIANA.

SCROLL-SAW.

SPECIFICATION forming part of Letters Patent No. 236,163, dated January 4, 1881.

Application filed April 2, 1880. (No model.)

*To all whom it may concern:*

Be it known that I, WILLIAM JONES, a citizen of the United States, residing at Portland, in the county of Jay and State of Indiana, have invented certain new and useful Improvements in Scroll-Saws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in scroll-saws which are driven by any desirable kind of motor or by a treadle to be operated by the foot of the person in attendance, the rotating shafts, balance-wheels, and pulleys of which act in conjunction with springs to which the saw is attached; and the objects of my improvements are, first, to reduce the friction of such machines, and, second, to provide two springs of equal length for supporting and moving the saw, whereby a portion of the power applied in moving said saw in the proper direction for causing it to do its work is utilized in causing it to move in the opposite direction, and whereby the proper rake is given thereto. I attain these objects by the mechanism illustrated in the accompanying drawings, in which—

Figure 1 is an elevation of the entire machine, showing the table upon which the substance to be sawed is placed, the legs for supporting it, the balance-wheels, pulleys, belt, connecting-rods, springs, and saw. Fig. 2 is a transverse elevation, showing the parts above alluded to and their arrangement. Fig. 3 is a plan view of the upper spring; and Fig. 4 is a similar view of the lower spring, showing the means of attaching the connecting-rod thereto.

Similar letters refer to similar parts throughout the several views.

In constructing scroll-saws of this type I use any suitable legs, A, for supporting the table or platform to which the parts are attached. The table B is placed in a horizontal position, and is to be of any required size and form, it being made of metal, wood, or any other suitable substance. To the under surface of this table there is attached a frame, C, in the lower end of which there are formed bearings for the reception of a shaft, D, upon which there is placed a wheel, E, in the periphery of which there is formed a semicircular groove for the reception of a band. In one of the arms of wheel E, which acts as a balance-wheel, or in some other part thereof, there is affixed a pin, E', to which a treadle is connected when the saw is driven by the foot of the operator; but when it is desirable to drive it by an engine of any kind a pulley is to be placed upon some part of shaft D for the reception of a belt from such engine. In the frame C, at a suitable point above the shaft D, bearings are provided for a shaft, G, upon the outer end of which there is secured a balance-wheel, G', which is for the purpose of steadying the movements of the saw, which it is enabled to do, owing to the fact that upon the opposite end of the shaft to which it is attached there is placed a pulley, H, around which the belt H' passes, by which said pulley is driven. Into the pulley H there is affixed a crank-pin, $H^2$, which is placed at such a distance from its center as to give to the saw the required range of movement. To this crank-pin a connecting-rod, I, is attached, which extends upward and has its upper end pivoted to a spring, K, one end of which is firmly secured to the table B, its opposite end being free to move vertically. In the free end of spring K there is formed a hook, which has a slot formed in it for the passage of the saw K', through the end of which there is formed an aperture for the reception of a pin which holds the saw in position at its lower end. To the upper surface of the table B, at the same point where the spring K is attached, there is affixed a spring, $K^2$, the free end of which is in a vertical line with that of spring K, its outer end being provided with a slotted hook for the passage of the saw, the same as that of spring K, and the saw is provided with a pin which rests in the hook, the same as in the lower spring. The saw K' extends from one to the other of the hooks in the ends of the springs, as shown in Fig. 1.

It is obvious that by so forming the springs that in placing the saw in position in their ends they will require to be pressed toward each other to the required extent the saw will not only be kept in position, but that it will at the same time have the requisite amount of strain put upon it.

It is also obvious that by the use of springs of equal length for carrying the saw, instead of levers working in bearings or in a frame, a large amount of friction is avoided, and that a portion of the force expended in moving the saw in either direction is utilized in moving it in the opposite one, as such force has the effect to move both springs in one direction, and as the reacting action of both is in the opposite direction and tends to retain the saw in its normal position; and that as the free ends of the springs move through the arc of a circle a sufficient rake will be given to the saw.

Having thus described my invention, what I claim, and desire to secure by Letters Patent, is—

In combination with the table and the driving mechanism of a scroll-saw, springs K and $K^2$, of equal length from the point where they are secured to the table to the points where they are attached to the saw, whereby, when said saw is in operation, the moving ends of the springs are both caused to move through an arc of the same circle, and whereby the requisite rake is given to the saw, as set forth.

In testimony whereof I affix my signature in presence of two witnesses.

WILLIAM JONES.

Witnesses:
JOHN W. MASON,
JOHN P. C. SHANKS.